United States Patent
Lin et al.

(12)

(10) Patent No.: US 12,151,781 B2
(45) Date of Patent: Nov. 26, 2024

(54) POWER MODULE OF ELECTRIC ASSISTED BICYCLE

(71) Applicant: Delta Electronics, Inc., Taoyuan (TW)

(72) Inventors: Hung-Wei Lin, Taoyuan (TW);
Yu-Xian Huang, Taoyuan (TW);
Li-Chi Wu, Taoyuan (TW); Chi-Wen Chung, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 247 days.

(21) Appl. No.: 17/880,640

(22) Filed: Aug. 3, 2022

(65) Prior Publication Data

US 2023/0406445 A1 Dec. 21, 2023

(30) Foreign Application Priority Data

Jun. 17, 2022 (CN) .......................... 202210691767.8

(51) Int. Cl.
| | |
|---|---|
| *B62M 6/50* | (2010.01) |
| *H02K 5/04* | (2006.01) |
| *H02K 7/08* | (2006.01) |
| *H02K 7/116* | (2006.01) |
| *H02K 11/24* | (2016.01) |

(52) U.S. Cl.
CPC ................. *B62M 6/50* (2013.01); *H02K 5/04* (2013.01); *H02K 7/08* (2013.01); *H02K 7/116* (2013.01); *H02K 11/24* (2016.01)

(58) Field of Classification Search
CPC . B62M 6/50; B62M 6/55; B62M 6/45; H02K 5/04; H02K 7/08; H02K 7/116; H02K 11/24; B62J 45/411; B62J 45/421

USPC ........................................................ 310/67 R
See application file for complete search history.

(56) References Cited

U.S. PATENT DOCUMENTS

| | | | |
|---|---|---|---|
| 6,196,347 B1 * | 3/2001 | Chao ..................... | G01L 3/1435 180/220 |
| 10,358,185 B2 | 7/2019 | Gao | |
| 2013/0133969 A1 | 5/2013 | Shimizu et al. | |

(Continued)

FOREIGN PATENT DOCUMENTS

| | | |
|---|---|---|
| CN | 203511966 U | 4/2014 |
| CN | 104554612 A | 4/2015 |

(Continued)

*Primary Examiner* — Ahmed Elnakib
(74) *Attorney, Agent, or Firm* — KIRTON McCONKIE; Evan R. Witt

(57) ABSTRACT

A power module of an electric assisted bicycle is disclosed and includes a pedal shaft, a gear-plate-output shaft, a reducer, a motor, a first sensor, a housing, a second sensor and a driving controller. The gear-plate-output, a reducer-output shaft and a reducer-fixed shaft of the reducer are disposed in parallel and sleeved on the pedal shaft concentrically. The motor drives the gear-plate-output shaft to rotate. The first sensor is disposed on the reducer-fixed shaft for sensing a first torque of the reducer-output shaft acting on the reducer-fixed shaft. The reducer-fixed shaft is connected to the housing. A frameset-fastening component protrudes outwardly from the housing, and is configured to fix the power module on the frameset. The second sensor is disposed on the frameset-fastening component for sensing a second torque of the power module acting on the frameset. The driving controller controls the motor in accordance with the second torque and the first torque.

10 Claims, 8 Drawing Sheets

(56) References Cited

U.S. PATENT DOCUMENTS

| | | | | |
|---|---|---|---|---|
| 2017/0183056 | A1* | 6/2017 | Yamamoto | F16H 63/50 |
| 2017/0219066 | A1* | 8/2017 | Yamamoto | B62M 6/55 |
| 2017/0259883 | A1* | 9/2017 | Yamamoto | F16H 3/724 |
| 2017/0274963 | A1* | 9/2017 | Yamamoto | B62M 6/90 |
| 2018/0057107 | A1* | 3/2018 | Yamamoto | B62M 11/16 |
| 2019/0331203 | A1 | 10/2019 | Mei et al. | |
| 2023/0099907 | A1* | 3/2023 | Chung | B60L 50/52 |
| | | | | 180/206.2 |
| 2023/0406445 | A1* | 12/2023 | Lin | H02K 11/24 |

FOREIGN PATENT DOCUMENTS

| | | |
|---|---|---|
| CN | 109153427 A | 1/2019 |
| CN | 110114264 A | 8/2019 |
| CN | 110843993 A | 2/2020 |
| JP | H09328092 A | 12/1997 |
| JP | 2016182851 A | 10/2016 |
| TW | M472666 U | 2/2014 |
| TW | I561431 B | 12/2016 |
| TW | M587148 U | 12/2019 |

\* cited by examiner

POWER MODULE OF ELECTRIC ASSISTED BICYCLE

FIELD OF THE INVENTION

The present disclosure relates to a power module, and more particularly to a concentrically disposed and mid-mounted power module of an electric assisted bicycle having two sensors set respectively without increasing the external dimension and space for improving the overall output precision of the power module and achieving the optimized control of the motor-assisted force.

BACKGROUND OF THE INVENTION

An electric assisted bicycle, also known as an e-bike, is a bicycle with an integrated electric motor and reducer used to assist propulsion through the motor power. Many kinds of e-bikes are available in the market, but they generally fall into two broad categories: the electric assisted bicycle that senses and assists the rider's pedaling power, and the conventional electric bicycle that is driven by the motor merely. Since the human-power and the motor-assisted force have to be integrated in the electric assisted bicycle at the same time, the reduction of the external size space has always been an important issue in the design of power module. In addition, the power module has to meet the coexistence of dual powers (the human-power and the motor-assisted force) at the same time, so as to optimize the performance of the power module under different usage scenarios. Therefore, the precision of force sensing is more required.

In the conventional power module of the electric assisted bicycle, the human-power input acted on the pedal shaft is used to control the input of the motor-assisted force. Therefore, the torque sensor needs to be disposed in contact with the central pedal shaft. However, since the diameter of the central pedal shaft is too small, it is difficult to add the torque sensor in contact with the central pedal shaft. Moreover, the conventional power module combined with the torque sensor in contact therewith has poor precision and high cost. In addition, the combination diameter of the pedal shaft and the torque sensor in contact therewith is larger, and it is not conducive to being concentrically sleeved by the output shaft for the motor-assisted force. Therefore, the output shaft for the motor-assisted force and the pedal shaft are designed in separate shafts according to the prior art, so that the volume of the power module is not easy to reduce.

On the other hand, as the motor is used to control the input of the motor-assisted force in the conventional electric bicycle, the output efficiency of the overall power (the human-power combined with the motor-assisted force) is monitored through the rotating speed merely. The output of the motor-assisted force is not monitored independently, so that it is not allowed to obtain the actual output of the motor-assisted force instantly. The combination of the pedal shaft and the torque sensor in contact therewith is not conducive to the concentric integration of the motor-assisted force. If another torque sensor is added to monitor the actual output of the motor-assisted force, the external dimensions need to be increased for measuring the human-pedaling output and the motor-assisted force, and the design of the power module tends to be more complicated Therefore, there is a need of providing a power module of an electric assisted bicycle utilizing the torque sensors combined easily to sense the human-pedaling output and the motor-assisted force simultaneously without increasing the external dimension and space, and performing a torque feedback according to the human-pedaling output and the motor-assisted force. Thus, the overall output precision of the power module is improved, the optimized control of the motor-assisted force is achieved, and the drawbacks encountered by the prior arts are obviated.

SUMMARY OF THE INVENTION

An object of the present disclosure is to provide a power module of an electric assisted bicycle. By utilizing the torque sensors combined easily to sense the human-pedaling output and the motor-assisted force simultaneously without increasing the external dimension and space, and implementing a torque feedback according to the human-pedaling output and the motor-assisted force, the overall output precision of the power module is improved, and the optimized control of the motor-assisted force is achieved.

Another object of the present disclosure is to provide a power module of an electric assisted bicycle. A first sensor and a second sensor are disposed on the reducer-fixed shaft and the housing of the power module respectively, so that the motor is controlled by the driving controller in accordance with a first torque sensed by the first sensor and a second torque sensed by the second sensor. When the pedal shaft is not pedaled by the rider, there is no signal generated by the first sensor and the second sensor. By comparing the difference value between the second torque and the first torque with a predetermined value, the timing and the action range for enabling the motor-assisted force are controlled through the driving controller. At the same time, the torque feedback of the motor-assisted force is implemented, so as to improve the overall output precision of the power module, and achieved the optimized control of the motor-assisted force.

In accordance with an aspect of the present disclosure, a power module of an electric assisted bicycle is provided. The power module includes a pedal shaft, a gear-plate-output shaft, a reducer, a motor, a first sensor, a housing, a second sensor and a driving controller. The pedal shaft is disposed along an axial direction. The gear-plate-output shaft is disposed in parallel with the pedal shaft along the axial direction and concentrically sleeved on the pedal shaft along a radial direction. The reducer includes a reducer-output shaft and a reducer-fixed shaft disposed in parallel with the gear-plate-output shaft along the axial direction, respectively. The reducer-output shaft is concentrically sleeved the gear-plate-output shaft along the radial direction. The motor is mechanically connected to the reducer and drives the reducer through a reducer-input shaft. The first sensor is disposed on the reducer-fixed shaft for sensing a first torque of the reducer-output shaft acting on the reducer-fixed shaft. The housing includes a frameset-fastening component and an accommodation space. The accommodation space is configured to accommodate the pedal shaft, the gear-plate-output shaft, the reducer and the motor. Two ends of the pedal shaft pass through the housing, respectively, the reducer-fixed shaft is connected to the housing, and the frameset-fastening component protruding outwardly from the housing is configured to fix the power module on a frameset. The second sensor is disposed on the frameset-fastening component for sensing a second torque of the power module acting on the frameset. The driving controller is electrically connected to the motor, the first sensor and the second sensor. The driving controller controls the motor in accordance with a difference value between the second torque and the first torque.

In an embodiment, when the difference value between the second torque and the first torque is greater than or equal to a predetermined value, the driving controller enables the motor to output a motor-output torque. In an embodiment, when the difference value between the second torque and the first torque is less than the predetermined value, the driving controller shuts down the motor.

In an embodiment, the first torque is a reducer-output torque acting on the reducer-fixed shaft in a tangential direction perpendicular to the axial direction.

In an embodiment, the second torque is a summed output torque including the reducer-output torque and a pedaling-output torque, wherein the pedaling-output torque acts on the housing in a tangential direction perpendicular to the axial direction.

In an embodiment, the gear-plate-output shaft is concentrically sleeved on the pedal shaft through a first one-way bearing along the radial direction, wherein when the pedal shaft is forced to rotate, the gear-plate-output shaft is driven by the pedal shaft through the first one-way bearing.

In an embodiment, the reducer-output shaft is concentrically sleeved on the gear-plate-output shaft through a second one-way bearing along the radial direction, wherein when the motor drives the reducer to rotate the reducer-output shaft, the gear-plate-output shaft is driven by the reducer-output shaft through the second one-way bearing.

In an embodiment, the housing includes a front fixing plate and a rear fixing plate disposed on two opposite sides of the housing along the axial direction, respectively, wherein the pedal shaft passes through the front fixing plate and the rear fixing plate along the axial direction.

In an embodiment, the fixed end of the reducer-fixed shaft is connected to the rear fixing plate, and the fixed end is concentrically sleeved on the pedal shaft through a first two-way bearing.

In an embodiment, a torsional rigidity of the rear fixing plate is greater than a torsional rigidity of the reducer-fixed shaft.

In an embodiment, a lateral edge of the gear-plate-output shaft is connected to the front fixing plate through a second two-way bearing, wherein the lateral edge of the gear-plate-output shaft is concentrically sleeved on the pedal shaft through a third two-way bearing.

In an embodiment, the reducer further includes an output gear and a fixed gear disposed on the reducer-output shaft and the reducer-fixed shaft, respectively, and the output gear and the fixed gear are matched with each other, so as to transmit the first torque when the reducer-output shaft drives the gear-plate-output shaft to rotate.

In accordance with the aspect of the present disclosure, the pedal shaft, the gear-plate-output shaft and the reducer-output shaft of the power module of the electric assisted bicycle are designed to form a coaxial structure and accommodated within the housing of the power module. The first sensor and the second sensor are disposed on the reducer-fixed shaft and the housing of the power module, respectively. Compared with the conventional current design having the complicated torque sensor combined with the center pedal shaft, and the pedal shaft arranged in parallel with the reducer-output shaft, the coaxial structure of the present disclosure is helpful of simplifying the installation of the sensors, saving the assembling space and reducing the entire volume. Since the sensing area and the assembling convenience of the sensors are not affected by the undersized diameter of the pedal shaft during installation, it has advantages of improving the precision of the sensors, reducing the cost, and improving the space utilization. In addition, the sensors are disposed in different positions to sense and obtain the information about the reducer-output torque and the pedaling-output torque, and the timing and the action range for enabling the motor-assisted force are controlled. At the same time, the torque feedback of the motor-assisted force is implemented, so as to improve the overall output precision of the power module, and achieved the optimized control of the motor-assisted force.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

Figure 1:
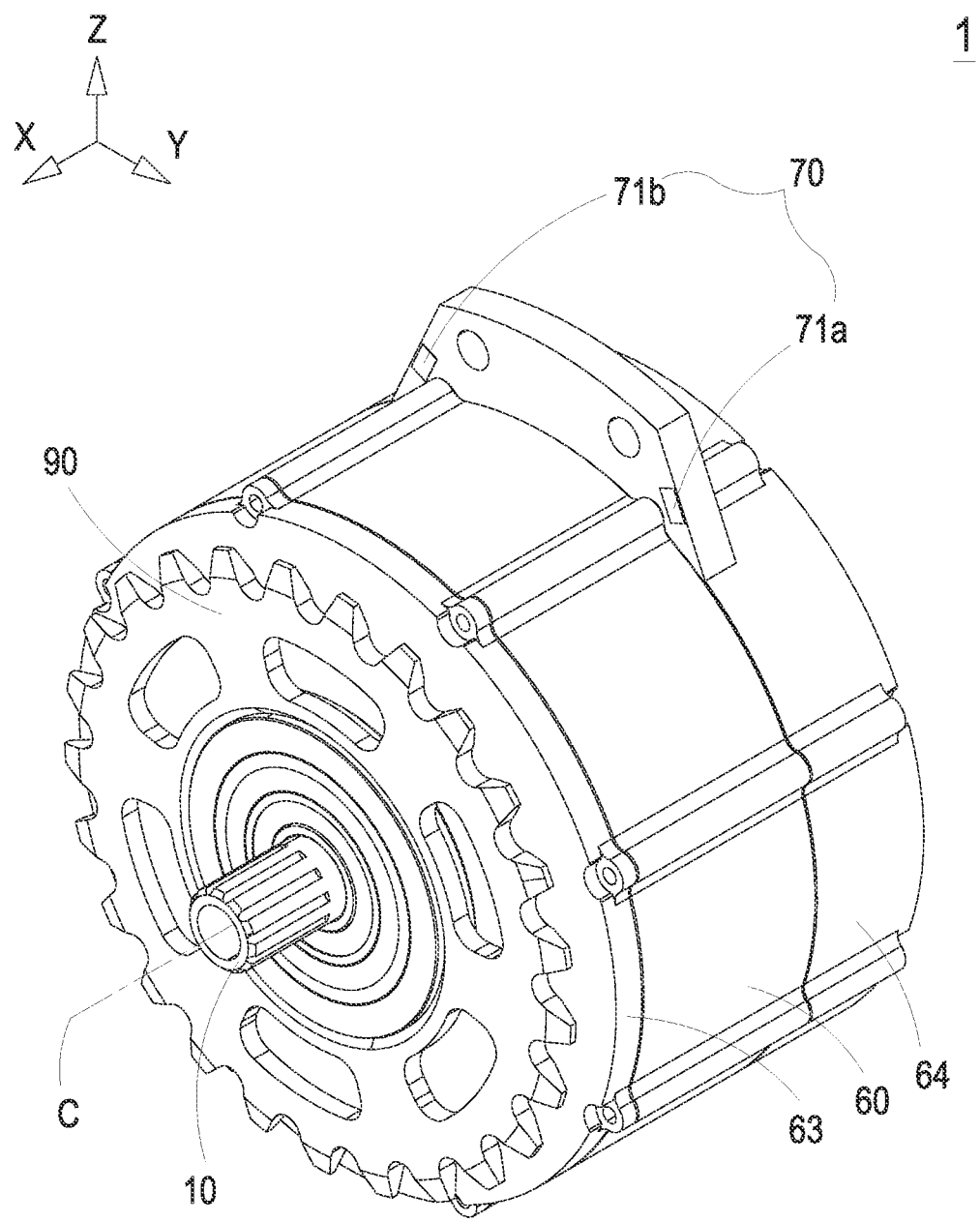
FIG. 1 is an exterior structural view illustrating a power module of an electric assisted bicycle according to an embodiment of the present disclosure.
Figure 2:
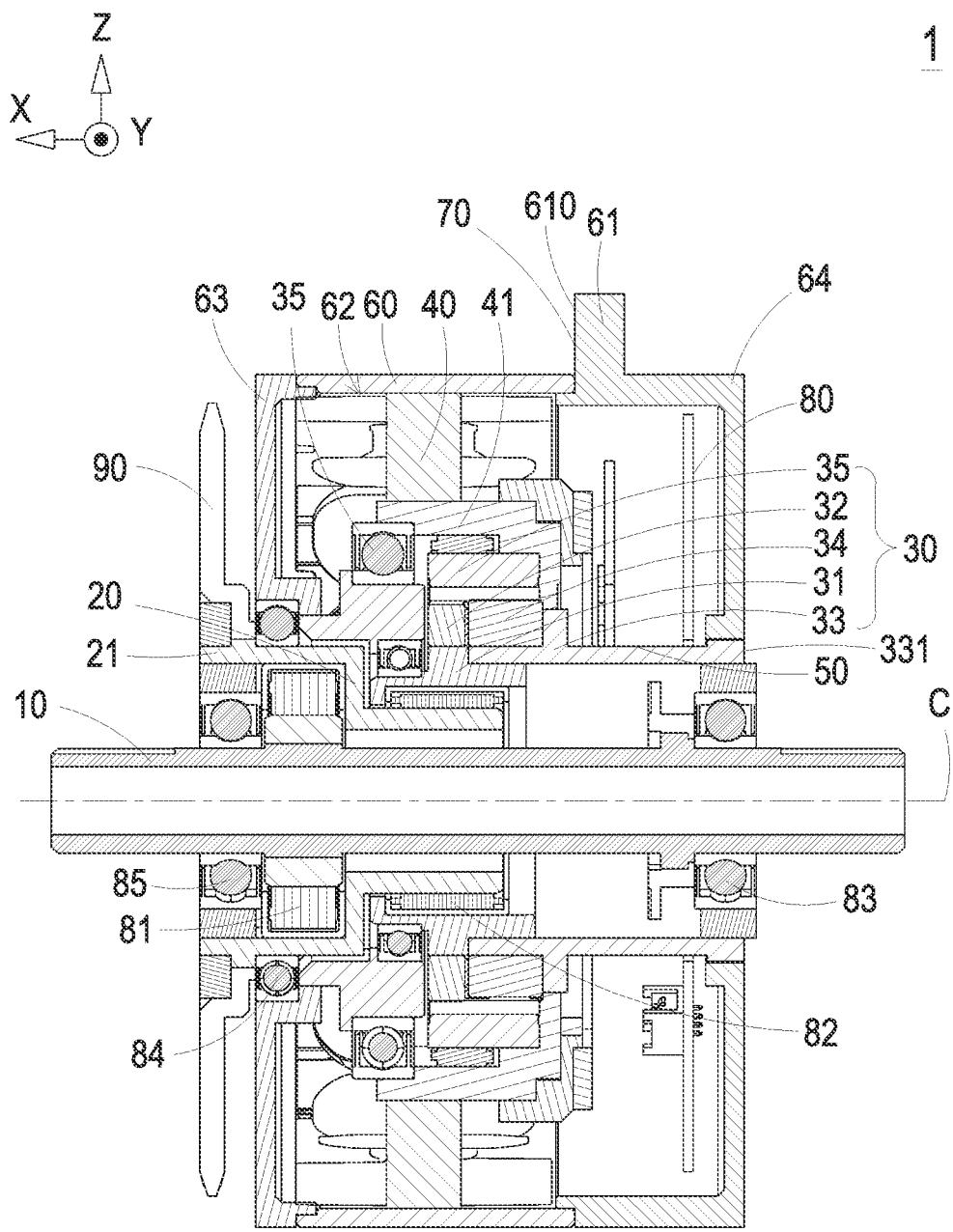
FIG. 2 is a cross-sectional view illustrating the power module of the electric assisted bicycle according to the embodiment of the present disclosure.
Figure 3:
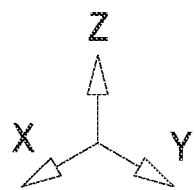
FIG. 3 shows the combination of the first sensor disposed on the reducer-fixed shaft according to the embodiment of the present disclosure.
Figure 3:
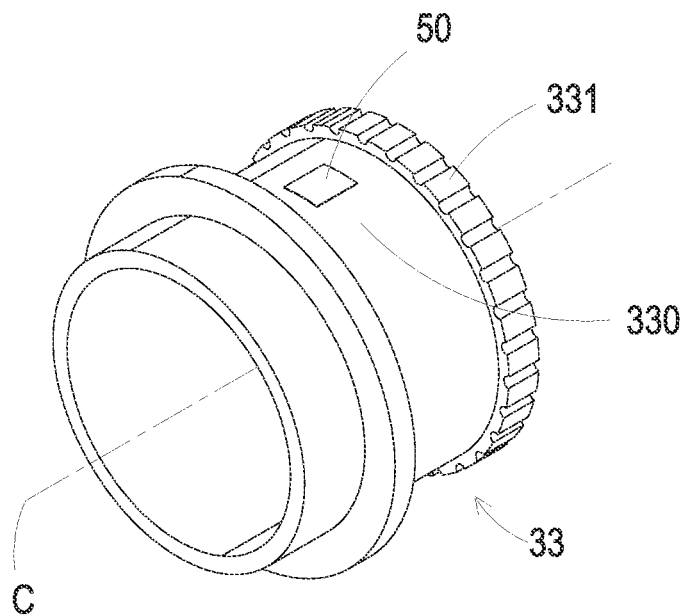
Figure 4:
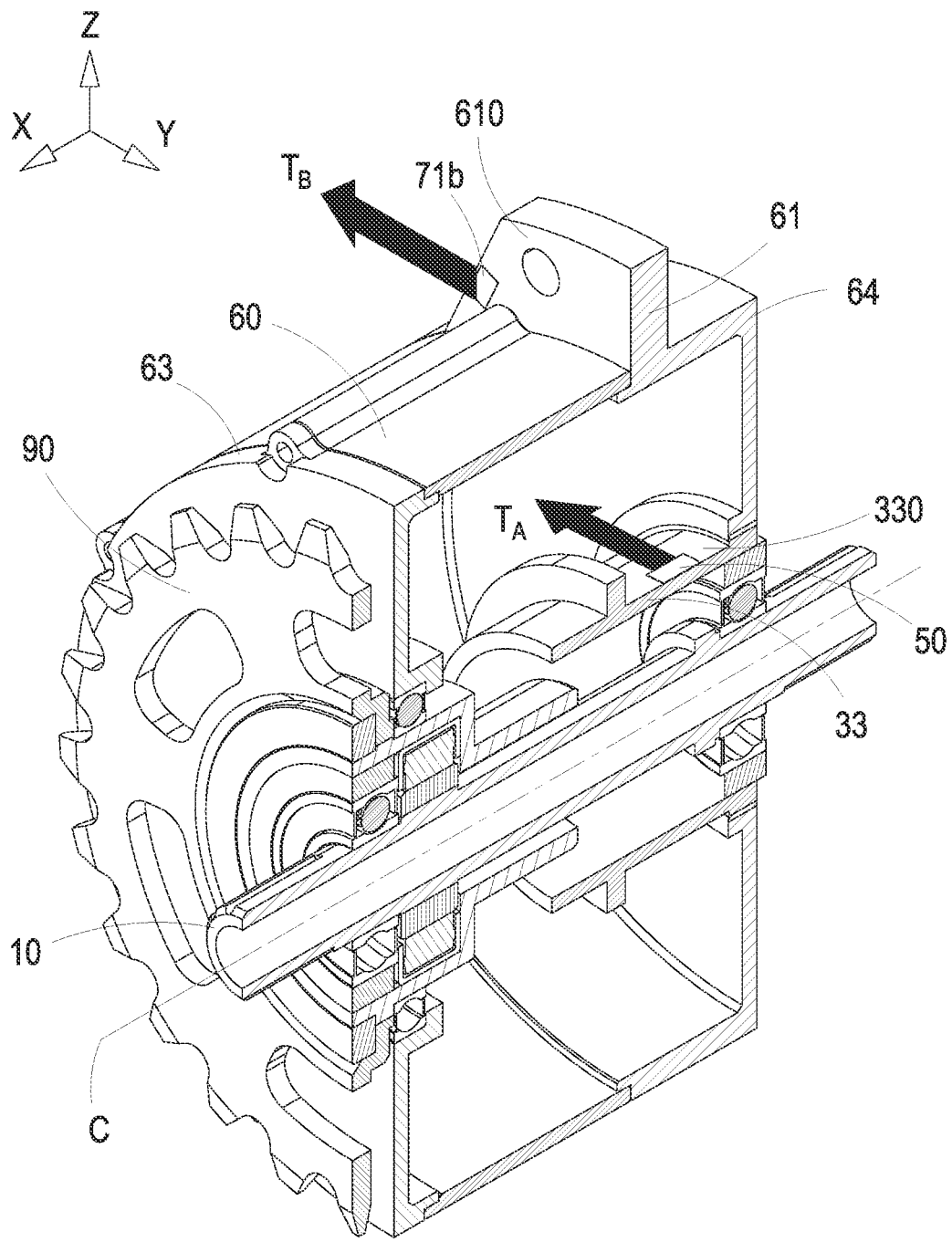
FIG. 4 is a schematic diagram showing the arrangement position of each sensor and the corresponding torque sensed thereby in the power module of the electric assisted bicycle according to the embodiment of the present disclosure.
Figure 5:
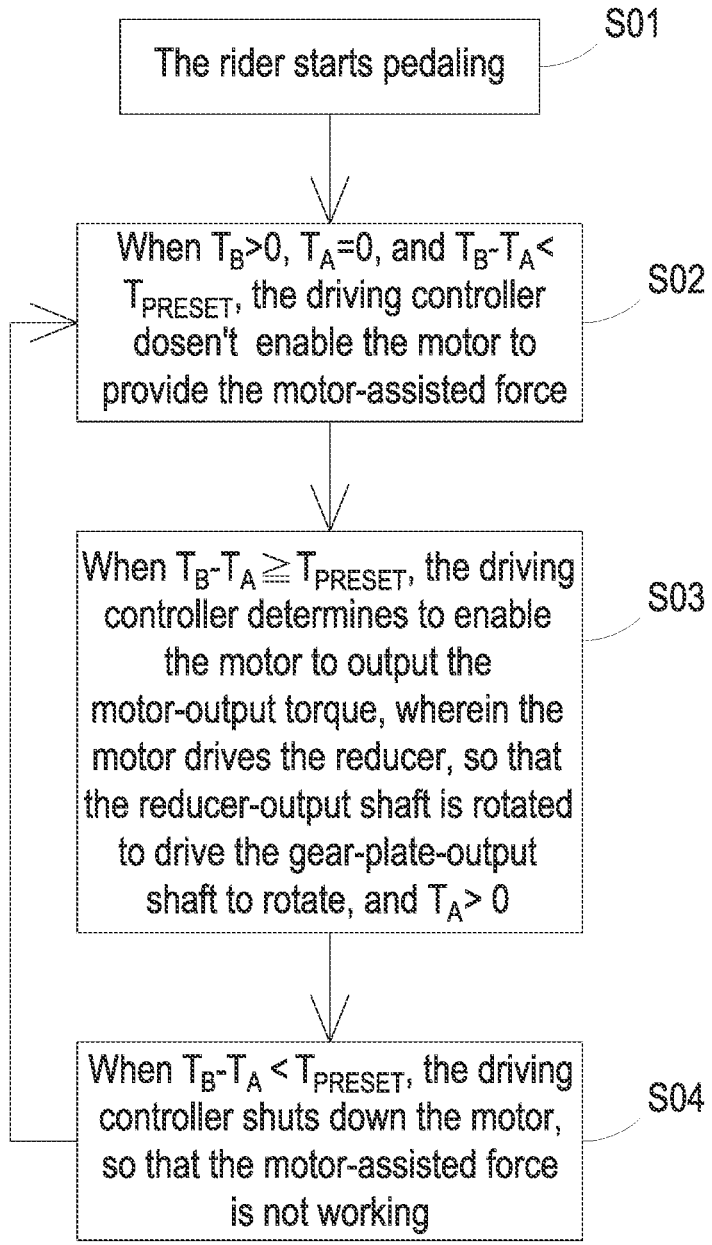
FIG. 5 is a flowchart showing the operation process of the power module of the electric assisted bicycle according to the embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

In the embodiment, a power module of an electric assisted bicycle (hereinafter referred to as the power module for short) 1 is applied in for example but not limited to a mid-mounted architecture and includes a pedal shaft 10, a gear-plate-output shaft 20, a reducer 30, a motor 40, a first sensor 50, a housing 60, a second sensor 70 and a driving controller 80. The aforementioned mid-mounted architecture means that the power module 1 is installed between the front wheel and the rear wheel of the electric assisted bicycle, and is usually used to be distinguished from a hub-type design installed on the wheel directly. In the embodiment, the pedal shaft 10 has a longitudinal direction disposed along an axial direction C. Preferably but not exclusively, the axial direction C is parallel to the X axis, and perpendicular to the Y axis and the Z axis. The direction of gravity is opposite to the Z axial direction. The gear-plate-output shaft 20 is in a shape of a long tube and disposed in parallel with the pedal shaft 10 along the axial direction C. An inner surface of the gear-plate-output shaft 20 is concentrically sleeved on an outer surface of the pedal shaft 10 through a first one-way bearing 81 along a radial direction. The radial direction is perpendicular to the aforementioned axial direction C. In an embodiment, when the pedal shaft 10 is forced by a rider's pedaling force to rotate in a forward direction, the gear-plate-output shaft 20 is driven to rotate by the pedal shaft 10 through the first one-way bearing 81. Preferably but not exclusively, in the embodiment, the reducer 30 includes a reducer-output shaft 31, an output gear 32, a reducer-fixed shaft 33, a fixed gear 34 and a reducer-input shaft 35. The reducer-output shaft 31, the reducer-fixed shaft 33 and the reducer-input shaft 35 are arranged in parallel with the pedal shaft 10 along the axial direction C. The pedal shaft 10 passes through the reducer-output shaft 31, the reducer-fixed shaft 33 and the reducer-input shaft 35 to form a coaxial structure. In the embodiment, the reducer-output shaft 31 is disposed in parallel with the gear-plate-output shaft 20 along the axial direction C, and concentrically sleeved on an outer surface of the gear-plate-output shaft 20 through a second one-way bearing 82 along the radial direction. Notably, the first one-way bearing 81 is a one-way clutch release bearing. Through the first one-way bearing 81, the pedal shaft 10 only drives the gear-plate-output shaft 20 to rotate in a single rotation direction. That is to say, the pedaling force is allowed to transmit in the forward pedaling direction to drive the gear-plate-output shaft 20 merely, so as to drive the vehicle to forward. If the pedal shaft 10 is forced by a pedaling force in the opposite direction, it is not allowed to drive the gear-plate-output shaft 20. In the embodiment, the motor 40 is mechanically connected to the reducer 30. Preferably but not exclusively, a motor-output shaft 41 of the motor 40 is mechanically connected to the reducer-input shaft 35 of the reducer 30 and drives the reducer 30 thereby. In that, the reducer-output shaft 31 of the reducer 30 is rotated, and the gear-plate-output shaft 20 is driven by the reducer-output shaft 31 through the second one-way bearing 82. Similarly, the second one-way bearing 82 is a one-way clutch release bearing. Through the second one-way bearing 82, the reducer-output shaft 31 only drives the gear-plate-output shaft 20 to rotate in a single rotation direction. That is to say, the reducer-output torque is allowed to transmit in the single rotation direction to drive the gear-plate-output shaft 20 merely, so as to drive the vehicle forward. In other words, the single rotation direction that can be enabled by the first one-way bearing 81 and the second one-way bearing 82 is the same, so that the driving actions of the human-pedaling output from the pedal shaft 10 and the motor-assisted force from the reducer-output shaft 31 are allowed to be added mutually on the gear-plate-output shaft 20. Certainly, the present disclosure is not limited thereto.

In the embodiment, the output gear 32 is disposed on the reducer-output shaft 31, and the fixed gear 34 is disposed on the reducer-fixed shaft 33. The output gear 32 and the fixed gear 34 are arranged along the axial direction C and matched with each other, so as to transmit the first torque $T_A$ when the reducer-output shaft 31 drives the gear-plate-output shaft to rotate. Preferably but not exclusively, in the embodiment, the first sensor 50 is disposed on an outer ring wall 330 of the reducer-fixed shaft 33, so as to sense the first torque $T_A$ of the reducer-output shaft 31 acting on the reducer-fixed shaft 33 when the reducer-output shaft 31 drives the gear-plate-output shaft 20 to rotate.

In the embodiment, the housing 60 is in a shape of a sleeve and disposed along the axial direction C. The housing 60 includes a frameset-fastening component 61 and an accommodation space 62. The accommodation space 62 is configured to accommodate the pedal shaft 10, the gear-plate-output shaft 20, the reducer 30 and the motor 40. Two ends of the pedal shaft 10 pass through the two sides of the housing 60 along the axial direction C, respectively, so that two opposite ends of the pedal shaft are exposed. The reducer-fixed shaft 33 is accommodated in the accommodation space 62, and a fixed end 331 of the reducer-fixed shaft 33 is connected to the housing 60. The frameset-fastening component 61 protrudes outwardly from the housing 60 and has a height difference with the outer surface of the housing 60, so that the frameset-fastening component 61 is configured to fix the power module 1 on a frameset (not shown). Preferably but not exclusively, in the embodiment, the second sensor 70 is disposed on a lateral wall 610 of the frameset-fastening component 61 for sensing a second torque $T_B$ of the power module 1 acting on the frameset. In the embodiment, the second torque $T_B$ is greater than or equal to the first torque $T_A$. The first torque $T_A$ and the second torque $T_B$ are used to control a motor-output torque of the motor 40.

In the embodiment, the driving controller 80 is electrically connected to the motor 40, the first sensor 50 and the second sensor 70. Preferably but not exclusively, in the embodiment, the first sensor 50 includes a strain gauge disposed on the outer ring wall 330 of the reducer-fixed shaft 33 along the axial direction C to sense a first torque $T_A$ such as the reducer-output torque. Preferably but not exclusively, the first torque $T_A$ is the reducer-output torque acting on the outer diameter of the reducer-fixed shaft 33 in a tangential direction perpendicular to the axial direction C. Preferably but not exclusively, in the embodiment, the second sensor 70 includes a strain gauge 71a and a strain gauge 71b disposed on a lateral wall 610 of the frameset-fastening component 61 along the radial direction and spaced apart from each other. The strain gauge 71a and the strain gauge 71b are used to sense a second torque $T_B$ of the power module 1 acting on the frameset. The second torque $T_B$ further acts on the frameset-fastening component 61 in a tangential direction perpendicular to the axial direction C. Preferably but not exclusively, the tangential direction perpendicular to the axial direction C is parallel to the forward direction of the vehicle, but the present disclosure is not limited thereto. In the embodiment, the driving controller 80 controls the motor 40 in accordance with a difference value between the second torque $T_B$ and the first torque $T_A$. The operation process of the power module 1 will be further described in the following.

In the embodiment, the housing 60 is in the shape of the sleeve disposed along the axial direction C and includes a front fixing plate 63 and a rear fixing plate 64. The front fixing plate 63 and the rear fixing plate 64 are disposed on two opposite sides of the housing 60 along the axial direction C, respectively. The accommodation space 62 is defined between the front fixing plate 63 and the rear fixing plate 64. Preferably but not exclusively, the two opposite ends of the pedal shaft 10 pass through the front fixing plate 63 and the rear fixing plate 64, respectively. In the embodiment, the fixed end 331 of the reducer-fixed shaft 33 is connected to the rear fixing plate 64, and the fixed end 331 is concentrically sleeved on the pedal shaft 10 through a first two-way bearing 83. Notably, the combination of the front fixing plate 63 and the rear fixing plate 64 is adjustable according to the practical requirements. The present disclosure is not limited thereto. In the embodiment, the frameset-fastening component 61 protrudes outwardly from the housing 60 in the radial direction. Preferably but not exclusively, the frameset-fastening component 61 protrudes from the outer peripheral edge of the rear fixing plate 64. In other embodiments, the frameset-fastening component 61 is extended outwardly from the outer peripheral edge of the housing 60 instead of protruding through the rear fixing plate 64. The present disclosure is not limited thereto. In the embodiment, the first sensor 50 is disposed on the reducer-fixed shaft 33, and the second sensor 70 is disposed on the frameset-fastening component 61 extended outwardly from the outer peripheral edge of the rear fixing plate 64. In order to meet the requirement of that the second torque $T_B$ sensed by the second sensor 70 is greater than the first torque $T_A$ sensed by the first sensor 50, it is preferable that a torsional rigidity of the rear fixing plate 64 is greater than a torsional rigidity of the reducer-fixed shaft 33. In addition, in the embodiment, a lateral edge 21 of the gear-plate-output shaft 20 is connected to the front fixing plate 63 through a second two-way bearing 84, and the lateral edge 21 is concentrically sleeved on the pedal shaft 10 through a third two-way bearing 85.

In the embodiment, the power module 1 further includes a chain sprocket 90 concentrically sleeved on the lateral edge 21 of the gear-plate-output shaft 20 along the radial direction, and assembled on the outer surface of the gear-plate-output shaft 20. When the pedal shaft 10 is forced by human pedaling and drives the gear-plate-output shaft 20 to rotate in the forward direction, the second torque $T_B$ is provided and transmitted through the chain sprocket 90. Preferably but not exclusively, the second torque $T_B$ is transmitted to a rear wheel (not shown) through a chain of the electric assisted bicycle, so that the electric assisted bicycle goes forward. Notably, the second torque $T_B$ is provided through the gear-plate-output shaft 20 or the chain sprocket 90. When the human-pedaling output is utilized for the forward rotation, the gear-plate-output shaft 20 is driven by the pedal shaft 10 through the first one-way bearing 81, and the chain sprocket 90 is rotated to provide the second torque $T_B$. When the motor-output shaft 41 of the motor 40 is also utilized to drive the reducer-output shaft 31 for the forward rotation, the gear-plate-output shaft 20 is driven by the pedal shaft 10 through the first one-way bearing 81 and the reducer-output shaft 31 through the second one-way bearing 82 at the same time, and the chain sprocket 90 is rotated to provide the second torque $T_B$. In other words, the power module 1 is selectively operated under a human-pedaling usage scenario or an electric-assisted usage scenario. Under the human-pedaling usage scenario, the motor-assisted force is not working, the first torque $T_A=0$, and the torque output provided through the gear-plate-output shaft 20 is generated by human pedaling on the pedal shaft 10 through the first one-way bearing 81 merely. Under the electric assisted usage scenario, the gear-plate-output shaft 20 is driven by the human-pedaling output from the pedal shaft 10 through the first one-way bearing 81 and the motor-assisted force from the reducer-output shaft 31 through the second one-way bearing 82 at the same time, and the output torques are added mutually and transmitted to the rear wheel through the chain, so that the electric assisted bicycle goes forward, and the first torque $T_A$ is sensed.

It should be noted that the gear-plate-output shaft 20 and the chain sprocket 90 of the present disclosure are disposed adjacent to the right-foot side or the left-foot side of the rider, and the aforementioned forward rotation is referred to a rotating direction of the gear-plate-output shaft 20 for rotating forwardly and driving the chain sprocket 90, the chain and the rear wheel. Thus, the electric assisted bicycle goes forward. Preferably but not exclusively, the rotating direction is a clockwise rotation or a counterclockwise rotation, which is observed and defined according to the configurations of the gear-plate-output shaft 20 and the chain sprocket 90 disposed adjacent to the right-foot side or the left-foot side of the rider. These rotation directions are matched with the first one-way bearing 81 and the second one-way bearing 82 to determine whether the electric assisted bicycle is driven to go forward. It prevents the parts from damages due to the wrong pedaling posture, but the present disclosure is not limited thereto.

Figure 6:
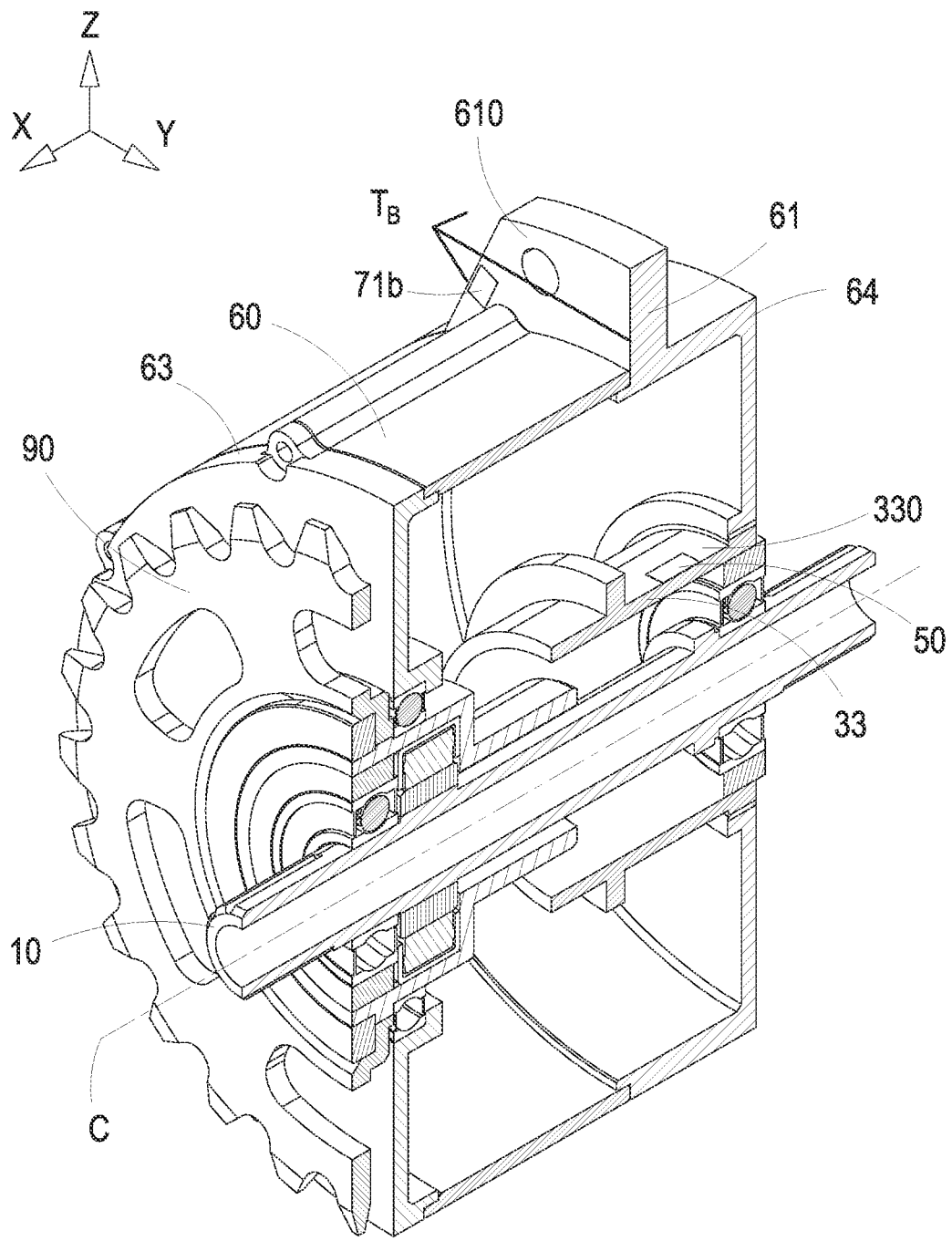
FIG. 6 is a diagram showing the corresponding torque sensed by the second sensor in the power module of the electric assisted bicycle according to the embodiment of the present disclosure when the motor-assisted force is not working.
Figure 7:
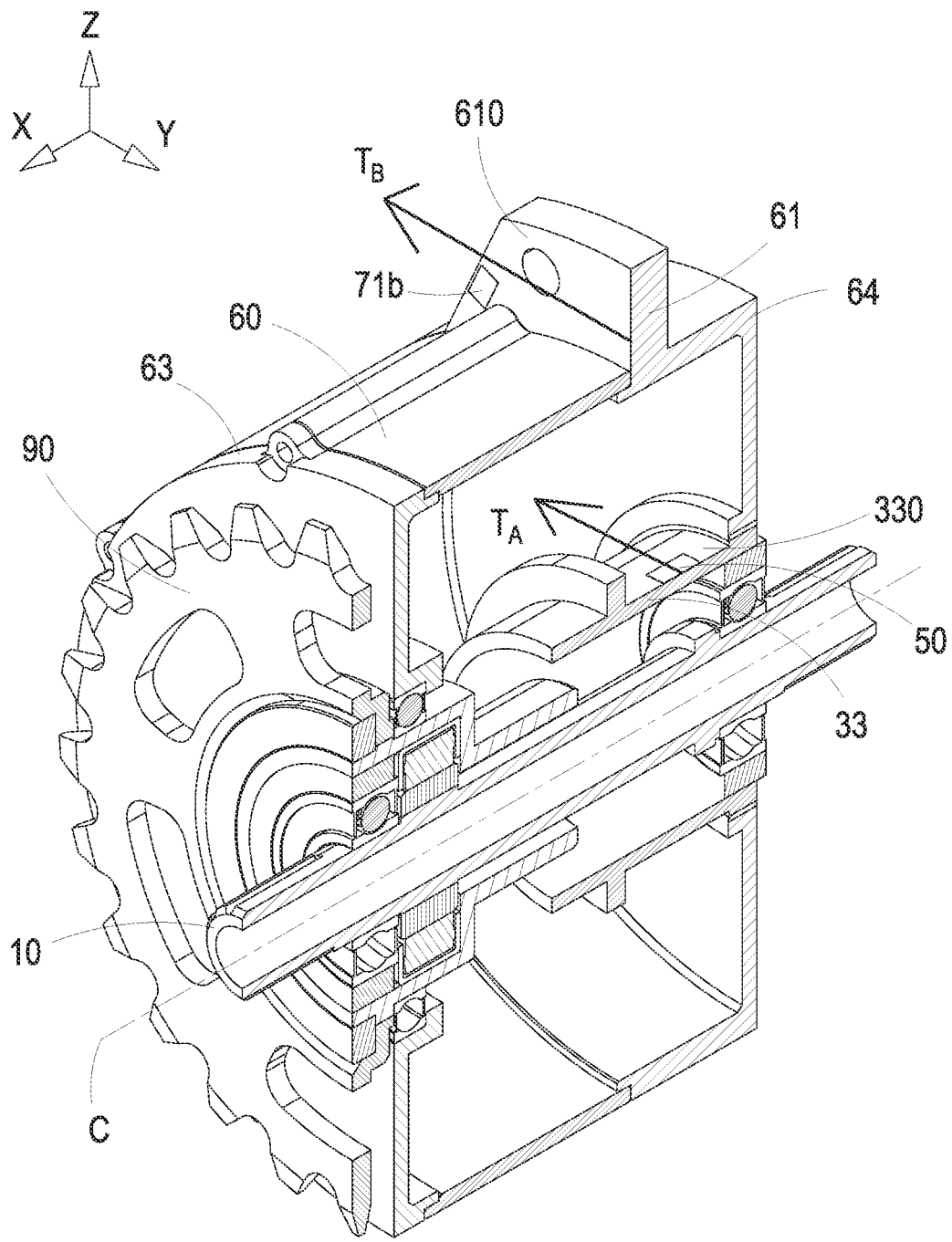
FIG. 7 is a diagram showing the corresponding torques sensed by the second sensor and the first sensor in the power module of the electric assisted bicycle according to the embodiment of the present disclosure when the motor-assisted force is working.

Please refer to FIG. 1 to FIG. 5. When the rider is not pedaling, there is no signal generated and sensed by the first sensor 50 or the second sensor 70, and the first torque $T_A$ and the second torque $T_B$ are both equal to zero at this time. When the rider starts pedaling, as shown in the step S01, the second sensor 70 senses the second torque $T_B>0$. Since the motor 40 is not enabled, the first sensor 50 senses the first torque $T_A=0$. In the embodiment, the driving controller 80 controls the timing and the action range for enabling the motor-assisted force of the motor 40 in accordance with a difference value between the second torque $T_B$ and the first torque $T_A$. In an embodiment, a predetermined value $T_{PRESET}$ is defined by the driving controller 80 firstly for determining the timing of enabling the motor 40. The initial values of the first torque $T_A$ and the second torque $T_B$ are both equal to zero. When the rider starts pedaling, the second torque $T_B$ is increased from zero. As shown in the step S02, in the beginning stage, the driving controller 80 determines that the difference value between the second torque $T_B$ and the first torque $T_A$ is greater than zero, but less than the predetermined value $T_{PRESET}$. At this time, the driving controller 80 doesn't enable the motor 40 to provide the motor-assisted force. In the embodiment, when the motor-assisted force of the motor 40 is not working, the reducer 30 is not driven, the first sensor 50 senses no signal, and the strain gauges 71a and 71b of the second sensor 70 correspondingly sense the second torque $T_B$ generated by the human-pedaling, as shown in FIG. 6. Thereafter, as shown in the step S03, when the driving controller 80 determines that that the difference value between the second torque $T_B$ and the first torque $T_A$ is greater than or equal to the predetermined value $T_{PRESET}$, the motor 40 is enabled by the driving controller 80, so that the motor-output torque is outputted from the motor-output shaft 41 of the motor 40. In detail, the motor 40 drives the reducer 30, so that the reducer-output shaft 31 is rotated to drive the gear-plate-output shaft 20 to rotate. At this time, the strain gauge of the first sensor 50 correspondingly senses the first torque $T_A>0$ acting on the reducer-fixed shaft 33 by the reducer-output shaft 31, and the strain gauge 71a and the strain gauge 71b of the second sensor 70 correspondingly sense the second torque $T_B$ of the power module 1 acting on the frameset, as shown in FIG. 7. Preferably but not exclusively, in the embodiment, the second torque $T_B$ is a summed output torque including the reducer-output torque (i.e., the first torque $T_A$) and a pedaling-output torque. The summed output torque acts on the housing 60 in a tangential direction perpendicular to the axial direction C. Preferably but not exclusively, the tangential direction perpendicular to the axial direction C is parallel to the forward direction of the vehicle, but the present disclosure is not limited thereto. In addition, under the action of the summed output torque including the human-pedaling output torque and the motor-assisted force, the driving controller 80 controls the motor 40 to output the motor-output torque stably. At this time, the first torque $T_A$ sensed by the first sensor 50 is maintained at a constant value. That is, the motor 40 maintains a constant output. If the human-pedaling output torque is reduced, the second torque $T_B$ sensed by the second sensor 70 is reduced. When the driving controller 80 determines that the difference value between the second torque $T_B$ and the first torque $T_A$ is less than the predetermined value $T_{PRESET}$ (i.e., $T_B$-$T_A$<$T_{PRESET}$), as shown in the step S04, the driving controller 80 shuts down the motor 40, so that the motor-output torque is not outputted.

Figure 8:
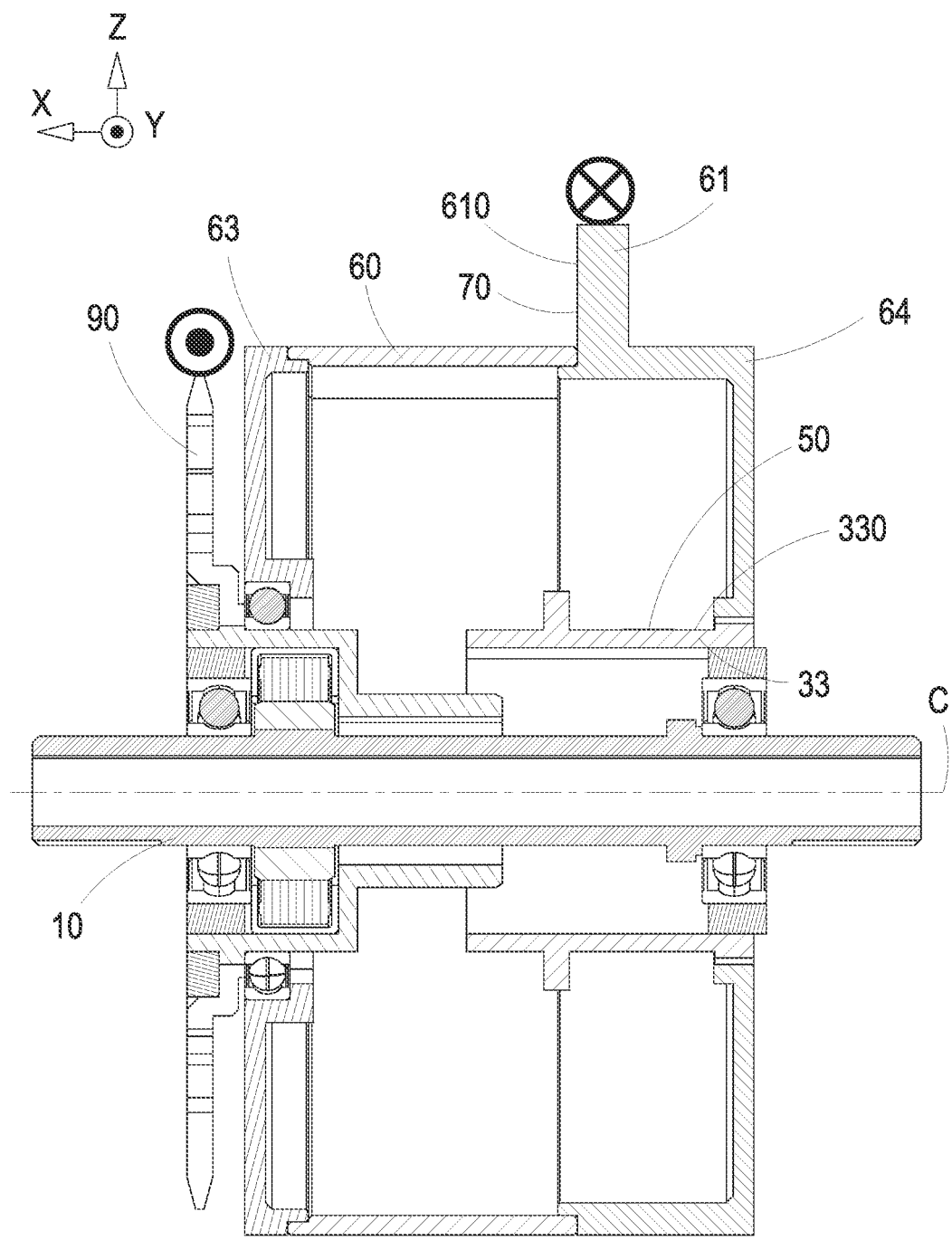
FIG. 8 is a schematic diagram showing the corresponding relationship of the summed output torque sensed by the second sensor and the pedaling-output torque the power module of the electric assisted bicycle according to the embodiment of the present disclosure.

As shown in FIG. 8, the second torque $T_B$ outputted from the gear-plate-output shaft 20 or the chain sprocket 90 is sensed by the strain gauge 71a and the strain gauge 71b of the second sensor 70. Under the electric assisted usage scenario, the second torque $T_B$ includes the pedaling-output torque and the reducer-output torque. Since the first torque $T_A$ sensed by the first sensor 50 is equal to the reducer-output torque, the pedaling-output torque is represented by the difference value between the second torque $T_B$ and the first torque $T_A$. That is, the pedaling-output torque=$T_B$-$T_A$.

In summary, the present disclosure provides a power module of an electric assisted bicycle. By utilizing the torque sensors combined easily to sense the human-pedaling output and the motor-assisted force simultaneously without increasing the external dimension and space, and implementing a torque feedback according to the human-pedaling output and the motor-assisted force, the overall output precision of the power module is improved, and the optimized control of the motor-assisted force is achieved. In addition, a first sensor and a second sensor are disposed on the reducer-fixed shaft and the housing of the power module respectively, so that the motor is controlled by the driving controller in accordance with a first torque sensed by the first sensor and a second torque sensed by the second sensor. When the pedal shaft is not pedaled by the rider, there is no signal generated by the first sensor and the second sensor. By comparing the difference value between the second torque and the first torque with a predetermined value, the timing and the action range for enabling the motor-assisted force are controlled through the driving controller. At the same time, the torque feedback of the motor-assisted force is implemented, so as to improve the overall output precision of the power module, and achieved the optimized control of the motor-assisted force.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power module of an electric assisted bicycle, comprising:
   a pedal shaft disposed along an axial direction;
   a gear-plate-output shaft disposed in parallel with the pedal shaft along the axial direction, and concentrically sleeved on the pedal shaft along a radial direction;
   a reducer comprising a reducer-output shaft and a reducer-fixed shaft disposed in parallel with the gear-plate-output shaft along the axial direction, respectively, wherein the reducer-output shaft is concentrically sleeved on the gear-plate-output shaft along the radial direction;
   a motor mechanically connected to the reducer and driving the reducer through a reducer-input shaft;
   a first sensor disposed on the reducer-fixed shaft for sensing a first torque of the reducer-output shaft acting on the reducer-fixed shaft;
   a housing comprising a frameset-fastening component and an accommodation space, wherein the accommodation space is configured to accommodate the pedal shaft, the gear-plate-output shaft, the reducer and the motor, wherein two ends of the pedal shaft pass through the housing, respectively, the reducer-fixed shaft is connected to the housing, and the frameset-fastening component protruding outwardly from the housing is configured to fix the power module on a frameset;
   a second sensor disposed on the frameset-fastening component for sensing a second torque of the power module acting on the frameset; and
   a driving controller electrically connected to the motor, the first sensor and the second sensor, wherein the driving controller controls the motor in accordance with a difference value between the second torque and the first torque.

2. The power module of the electric assisted bicycle according to claim 1, wherein when the difference value between the second torque and the first torque is greater than or equal to a predetermined value, the driving controller enables the motor to output a motor-output torque, wherein when the difference value between the second torque and the first torque is less than the predetermined value, the driving controller shuts down the motor.

3. The power module of the electric assisted bicycle according to claim 1, wherein the first torque is a reducer-output torque acting on the reducer-fixed shaft in a tangential direction perpendicular to the axial direction.

4. The power module of the electric assisted bicycle according to claim 3, wherein the second torque is a summed output torque including the reducer-output torque and a pedaling-output torque, wherein the pedaling-output torque acts on the housing in a tangential direction perpendicular to the axial direction.

5. The power module of the electric assisted bicycle according to claim 1, wherein the gear-plate-output shaft is concentrically sleeved on the pedal shaft through a first one-way bearing along the radial direction, wherein when the pedal shaft is forced to rotate, the gear-plate-output shaft is driven by the pedal shaft through the first one-way bearing.

6. The power module of the electric assisted bicycle according to claim 5, wherein the reducer-output shaft is concentrically sleeved on the gear-plate-output shaft through a second one-way bearing along the radial direction, wherein when the motor drives the reducer to rotate the reducer-output shaft, the gear-plate-output shaft is driven by the reducer-output shaft through the second one-way bearing.

7. The power module of the electric assisted bicycle according to claim 1, wherein the housing comprises a front fixing plate and a rear fixing plate disposed on two opposite sides of the housing along the axial direction, respectively, wherein the pedal shaft passes through the front fixing plate and the rear fixing plate along the axial direction.

8. The power module of the electric assisted bicycle according to claim 7, wherein a fixed end of the reducer-fixed shaft is connected to the rear fixing plate, and the fixed end is concentrically sleeved on the pedal shaft through a first two-way bearing, wherein a torsional rigidity of the rear fixing plate is greater than a torsional rigidity of the reducer-fixed shaft.

9. The power module of the electric assisted bicycle according to claim 8, wherein a lateral edge of the gear-plate-output shaft is connected to the front fixing plate through a second two-way bearing, wherein the lateral edge of the gear-plate-output shaft is concentrically sleeved on the pedal shaft through a third two-way bearing.

10. The power module of the electric assisted bicycle according to claim 1, wherein the reducer further comprises an output gear and a fixed gear disposed on the reducer-output shaft and the reducer-fixed shaft, respectively, and the output gear and the fixed gear are arranged along the axial direction and engaged with each other, so as to transmit the first torque when the reducer-output shaft drives the gear-plate-output shaft to rotate.

* * * * *